United States Patent [19]

Duckworth et al.

[11] 4,254,369

[45] Mar. 3, 1981

[54] HIGH ACCURACY SHAFT ANGLE LINEAR DC VOLTAGE CONVERSION USING LOW ACCURACY DEVICES

[75] Inventors: James J. Duckworth, Parsippany; David J. Simon, Saddle Brook, both of N.J.

[73] Assignee: The Singer Company, Little Falls, N.J.

[21] Appl. No.: 959,822

[22] Filed: Nov. 13, 1978

[51] Int. Cl.³ .................................................. G05B 1/06
[52] U.S. Cl. .................................. 318/654; 340/347 SY
[58] Field of Search ............... 318/654, 655, 656, 657, 318/658, 659, 660, 661; 340/347 SY

[56] References Cited

U.S. PATENT DOCUMENTS

| 3,505,669 | 4/1970 | Welch | 340/347 SY |
| 3,510,867 | 5/1970 | Sliwa | 318/347 SY |
| 3,735,391 | 5/1973 | Games et al. | 318/654 |
| 3,849,774 | 11/1974 | Barth | 340/347 SY |

*Primary Examiner*—Gene Z. Rubinson
*Assistant Examiner*—Eugene S. Indyk
*Attorney, Agent, or Firm*—John C. Altmiller; Thomas W. Kennedy

[57] ABSTRACT

In order to provide high accuracy shaft angle to linear DC voltage conversion using low accuracy devices, a linear synchro is excited by a 2.5 KHZ square wave which is power buffered, the square wave also used to synchronously demodulate the output of the wound component by sampling and a demodulated voltage then filtered and scaled to the required levels using commonly available operational amplifiers.

7 Claims, No Drawings

HIGH ACCURACY SHAFT ANGLE LINEAR DC VOLTAGE CONVERSION USING LOW ACCURACY DEVICES

BACKGROUND OF THE INVENTION

This invention relates to converters in general and more particularly to a conversion technique which is particularly applicable in obtaining a shaft angle to linear DC voltage conversion.

It is often necessary to translate a shaft angle position into a proportional DC voltage for use in DC servo loops, displays and so forth. Often a linear potentiometer is used. However, this approach suffers in high accuracy applications because of both the expense and the poor reliability of the device.

Another well known approach to the solution of this problem is the use of a linear synchro. Typically such synchros are excited with a 400 HZ sinusoidal waveform and the output of the synchro is demodulated using synchronous demodulation techniques in order to transform the resulting 400 HZ sinusoidal output into a required DC voltage. Typically, accuracies for such a synchro is 0.5% of full scale with the associated electronics typically causing another 0.1% error. Increasing the accuracy requires a large increase in the cost of both the wound component and the electronics.

Similar problems exist in other types of devices such as conventional synchros, resolvers and also in linear and rotary variable differential transformers.

SUMMARY OF THE INVENTION

It is the object of the present invention to provide an improved method and apparatus which permits obtaining higher accuracy from devices which inherently, as now used, have lower accuracy.

In the broadest aspects, the present invention comprises sampling the output from the synchro device at a point where the output waveform is least distorted. Although, the present invention has been used and tested only with linear synchros to be described in more detail below, it is believed that the technique is equally applicable to the conventional rotary synchros and resolvers and also to linear and rotary variable differential transformers.

Furthermore, it has been found beneficial to use a relatively high frequency square wave for excitation. In the illustrated embodiment, a 2.5 KHZ square wave is used. However, other frequencies are equally applicable even down to the 400 HZ typical excitation frequency and below.

The essential elements of the present invention comprise means to develop an excitation signal for use both in exciting the wound component; means to develop a sampling signal which is synchronized with but phase shifted with respect to the excitation frequency and which is the same frequency or a multiple thereof for use in sampling; and means to filter, store and scale the sampled output voltage of the wound component.

In the specific linear synchro DC converter illustrated, the selected excitation frequency is 2.5 KHZ. This frequency is obtained by dividing down a higher frequency in a counter. Through such a division, a sampling frequency which is synchronized to the excitation frequency is thus readily available. The synchro output is coupled as an input to an analog switch, the output of which is in turn coupled to a sample and hold circuit. Two stages of sample and hold along with buffering stage are provided, whereafter the final result is coupled through an amplifier with variable gain to provide the final circuit output.

BRIEF DESCRIPTION OF THE DRAWINGS

FIG. 1 is a block diagram of the converter system of the present invention.

FIG. 2 is a circuit-logic diagram of the converter of FIG. 1.

FIG. 3 is a waveform diagram helpful in understanding the operation of the converter of FIG. 2.

DETAILED DESCRIPTION OF THE INVENTION

FIG. 1 illustrates, in block diagram form, the elements of the present invention. Shown is a linear synchro 11 having a stator winding 13 and a rotor winding 15. The rotor winding 15 is coupled to a shaft 17, the angular position of which it is desired to measure and provide a DC output proportional thereto. Although, in the illustrated embodiment it is the stator that is excited, it should be noted that the rotor could equally well be excited. The stator is excited by an oscillator and driver 19 which also provides a sampling frequency output on line 21. The output of the rotor winding 15 is provided as an input to a converter 23 which receives as a further input the sampling frequency on line 21 and provides a DC output on line 25. Associated with the converter is a gain control 27.

FIG. 2 is a more detailed schematic—logic diagram of the oscillator and converter. The main oscillator itself is formed by a circuit 31 which includes Nor gates 33 and 35 having their inputs tied together and coupled in series. The output of Nor gate 35 is fed back through a capacitor 37 and resistor 39 to the input of Nor gate 33. The junction point at the output of Nor gate 33 is also fed back through a resistor 41 to the input of Nor gate 33. This is a well known type of oscillator circuit. Typically, the gates can be CD 4001 AF gates. The value of capacitor 37 is 270 pf, resistor 39 is 200K and resistor 41 is 68K. With this particular embodiment, the oscillator 31 establishes a frequency of 20k HZ. The oscillator output is shown as waveform 41 of FIG. 3.

This output is an input to a Johnson counter 43. Counter 43 can be a CD 40222BF counter. The nature of the outputs of the Johnson counter is shown by curves 44–47 and 144–147 of FIG. 3. It is such, that each of the eight outputs will be present for only one period of the input waveform 41. The first output of the counter 43 is the set input to a flip-flop 48 made up of cross-coupled Nor gates 49 and 50. The reset input to the flip-flop made of gates 49 and 50 is the fifth output of the counter shown as waveform 144. This flip-flop acts to provide a waveform of 50% duty cycle where frequency is one-eighth of the input waveform 41, and is shown as waveform 52 on FIG. 3. The output of the flip-flop 48 is coupled into a driver/buffer 51, the output of which drives the winding 13 of FIG. 1. The Johnson counter was selected because of the outputs it provides. Alternatively, an ordinary binary counter may be used with its outputs decoded as necessary to provide waveforms 46 and 47. The use of such a counter would eliminate the need for flip-flop 48.

In driver buffer 51, the output of flip-flop 48 is coupled to the bases of two transistors 53 and 55, one an NPN and the other a PNP transistor having their emitters coupled together. Coupling is through a resistor 57.

A bypass capacitor 59 is coupled between the input to the bases of the transistors 55 and 53 and ground. The common emitter point of the two transistors is also grounded. The collector of transistor 53 is coupled through a resistor 61 and a resistor 63 to the positive voltage supply, typically 15 volts. Similarly, the collector of transistor 55 is coupled through a resistor 65 and resistor 67 to the negative supply voltage, typically 15 volts DC. At the junction of resistor 61 and 63 connection is made to the base of a transistor 69. Similarly, a connection is made from the junction of resistor 65 and 67 to the base of a transistor 71. Transistor 69 is a PNP and transistor 71 an NPN transistor. Transistor 69 has its emitter coupled to the positive voltage supply and transistor 71 has its emitter connected to the negative voltage supply. The two transistors have their collectors coupled together and to the voltage output to the wound component on line 73. A ground line 75 is also brought out and it is across these two lines that the winding 13 of FIG. 1 is connected. Bypass capacitors 77 are provided between each of the supply voltage lines and ground. Furthermore, a diode 79 is coupled across the emitter collector paths of each of the two transistors 69 and 71 for protection against any reverse voltages resulting from the inductive load which is driven.

The two gates in the flip-flop 48 can be of the same type mentioned above in connection with the oscillator. Transistors 69 and 55 can be 2N2907A, transistors 53 and 71, 2N2222A, diodes 79 iN483B, resistor 57 may be 30K, capacitor 59 100ff, resistors 61 and 65 may be 3K, resistors 63 and 67 may be 510 ohms, and capacitor 77 may be 0.047µf.

The CMOS circuits which are used, i.e., gates, counter, and switches to now be described, can only tolerate a total swing of 15 volts. Thus in order to provide the supply voltages for these devices a voltage regulator 81 is provided. The voltage regulator includes a circuit for the positive voltage and a circuit for the negative voltage. In each case the circuit comprises a resistor 83 in series with a diode 85. The diodes are, of course, Zener diodes, typically 1N754A and naturally have the opposite polarity in the positive and negative voltage circuits. Typically, resistors 83 can be 510 ohm resistors.

The converter 23 itself, includes an input resistor 91 coupling the synchro output to a switch 93. This switch along with the other switch to be described below are contained with a micro-circuit, which can be a CD 4016BF.

With reference to FIG. 3, the output voltage of the linear synchro will have a waveform such as that shown on waveform 95. Depending on where the rotating winding is relative to the stator winding, the waveform 95 will either be in phase or out of phase with the waveform 52. As illustrated, it is in phase. If out of phase, it would be inverted. What this means is that the input will either sense a positive or a negative voltage. The switch 93 has at its switching input waveform 47 the third output of the Johnson counter 43. What this means is that any disturbances at the beginning of the waveform are avoided. What is sampled is shown as the waveform 97. It is essentially a square slice with a slightly decreasing slope. When the switch is closed, this output from the synchro is coupled to a capacitor 101 and the capacitor begins integrating over the time that the signal is present. At the end of that time the switch opens and the value remains stored on the capacitor 101. This thus forms a sample and hold circuit. In order to give additional smoothing and to avoid a saw tooth at the final circuit output an additional stage of sample and hold is provided. Thus an additional resistor 103 couples the capacitor 101 to the input to the switch 105, at the output of which there is another capacitor 107. Switch 105 is operated by the fourth output of the counter, i.e., waveform 47 of FIG. 3. Thus, the voltage developed on the capacitor 101 is sampled and transferred to the capacitor 107. Now the output of this capacitor is buffered by a unity gain amplifier 109 having the capacitor output coupled to its non-inverting input, and negative feedback through a resistor 111. The output of amplifier 109 is then coupled through an amplifier 113 with variable gain. The non-inverting input of amplifier 109 is coupled through resistors 115 and 117 in series to ground. The junction point of these two resistors is brought out on a line 119. This permits applying voltage to that line to correct for amplifier DC offset. The output of the buffer amplifier 109 is coupled through a resistor 121 into the inverting input of amplifier 113. A capacitor 123 is coupled from the output of amplifier 113 to its input. This is a small value capacitor used to obtain some filtering. In order to achieve a variable gain function, a resistor 125 having one terminal coupled to the output of amplifier 113, has its other lead brought out of the circuit. Similarly, a resistor 127 having one lead coupled to the inverting input of amplifier 113 has its other lead brought out. These three inputs, i.e., the circuit output on line 25 and the two resistors, constitute the input to the gain control 27 of FIG. 1. The gain control 27 essentially comprises interconnecting of the various leads. For example, one gain can be established by coupling together lines 120 and 128. This will result in feedback with the two resistors in series. Alternatively, the voltage output on line 25 can be connected to the line 128 to place only the resistor 127 in the feedback circuit. Finally, an additional resistor can be placed between the lines 126 and 128 to add further resistance to the feedback.

The amplifiers 109 and 113 may be one package of an LM 747 Dual amplifier. The capacitors 101 and 107 may be 0.047µF capacitors, resistors 91 and 103 may be 510 ohm resistors, resistor 111 5.1k, resistor 121 10k, resistor 115 6.7k, resistor 117 may be 100 ohms, resistor 125 may be 9k and resistor 127 may be 6k.

From the discussion above, it can be seen that sampling near the end of the waveform 95, i.e., the waveform from the synchro, more accurate results are obtained. Theoretically in a perfect system the waveform 95 would remain at one level over the full half cycle. Further, it should be evident that the technique can be applied to other types of synchros, resolvers and to linear and rotary variable differential transformers.

The system of the present invention gives a linearity which is better than the linearity of the components used, based on their use in conventional fashion. For example, empirical data has shown overall accuracy from 0.12% to 0.2% using a standard 0.5% accuracy wound component. Moreover, the saturation voltages of the output transistors vary over temperature to tend to compensate for variations of transformation ratio over temperature, further increasing the overall accuracy of the approach.

The frequency is not absolutely critical. However, an important feature of the present invention is the use of a higher frequency square wave. This makes generation of a sinusoidal voltage, which is both cumbersome and expensive, unnecessary. A square wave is singularly easy to develop and buffer. The synchronous demodulation of the square wave using the sampling technique of the present invention is also easier and less costly than the techniques required to act on a sinusoidal waveform [for instance, using a sinusoidal waveform in order to develop the necessary sampling waveforms would require means to multiply and synchronize the excitation frequency. This could be done, for example, with a phase locked loop in which the voltage oscillator output was divided and fed back to the phase comparator. However, the increased complexity is quite evident]. Operating at a higher frequency minimizes potential droop errors in the sample and hold circuits and the wound components, makes filtering easier and increases the potential band width of the demodulator circuit.

Thus, a low cost device with improved accuracy has been shown. Again, it is noted that although the present system has been described in connection with the linear synchro, it is equally applicable to other types of synchros. For example, if one wished to operate with a conventional resolver using the system of the present invention the only necessary modification would be to provide a duplicate of circuit 23. This circuit would be coupled to another winding such as the winding 15 which was rotated 90° therefrom. The inputs rather than being linearly related to shaft angle would represent the sine and cosine of the shaft angle and similarly the final outputs on the respective lines 25 from the two converters would represent the DC voltages proportional to the sine and cosine of the angle.

Further, the specifically illustrated demodulating technique including the sample and hold circuit, filtering, buffering and gain setting and adjustment are not essential to the present invention in its broadest aspects. Other well known circuits and techniques can be used to carry out these functions.

What is claimed is:

1. A method of exciting and demodulating a synchro having an input winding and an output winding, the voltage of the output winding be proportional to a shaft position comprising:
   a. generating a square wave having a frequency which is eight times the desired excitation frequency;
   b. dividing said frequency in a Johnson counter so as to develop eight outputs each of which is present, in sequence, only for one period of the generated square wave;
   c. developing from outputs of said counter a signal having a 50% duty cycle and having a period eight times that of the originally square wave;
   d. buffering and amplifying said signal and coupling said signal to the synchro input winding;
   e. sampling the output of the synchro over the time during which the third output of the counter appears; and
   f. buffering and scaling said sampled output to provide DC voltage proportional to shaft angle.

2. The method according to claim 1 and further including carrying out an additional step of sampling and storing the voltage sampled and stored during said third output over the period of the fourth output of said counter prior to buffering and scaling.

3. In a synchro transformer device having at least a fixed winding and a movable winding, the improvement comprising:
   an oscillator generating a square wave pulse train in the kilohertz range said oscillator having its output coupled across one of the windings of said synchro and developing a sampling signal synchronized with said square wave pulse train phase shifted therefrom,
   means coupled across the other of said windings of said synchro for coupling the voltage thereon in response to said sampling signal,
   a counter having the output of said oscillator as an input for dividing said oscillator output by eight, said counting providing eight separate outputs each of which is present for a separate successive pulse of said square wave pulse train,
   a flip-flop circuit for providing a final output derived from said counter having a 50% duty cycle whose frequency is one-eighth that of the other original pulse train,
   driver means having the output of said flip-flop circuit as an input and providing an output for coupling to one winding of said synchro transformer,
   one of the outputs of said counter providing said sampling frequency,
   a switch receiving an input from the other of said windings,
   a capacitor coupled to the output of said switch, said switch being controlled by said sampling frequency output from said counter, whereby upon closure of said switch, the voltage on said winding will be sampled and stored on said capacitor, said capacitor holding said voltage once said switch is opened,
   a unity gain buffering amplifier having its input coupled to said capacitor,
   means for amplifying and scaling the sampled voltage providing a DC output proportional to the relative position of said two windings, and
   a second switch and a second capacitor interposed between said first capacitor and said amplifier, said second switch driven by the next successive output of said counter.--.

4. The improvement according to claim 3 wherein said switches are driven by the third and fourth outputs of said counter respectively.

5. The improvement according to claim 4 wherein said means for amplifying and scaling comprise:
   a. an operational amplifier having an inverting and a non-inverting input, the output of said buffer amplifier coupled to the inverting input of said amplifier with a feedback resistance coupling the output of said amplifier to its inverting input; and
   b. means to vary the value of said feedback resistance.

6. The improvement according to claim 5 wherein said means to vary comprises:
   a. a first resistor having one end coupled to the output of said amplifier and its other end coupled to an external terminal; and
   b. a second resistor having one end coupled to the inverting input of said amplifier and another end coupled to the second external terminal, the output of said amplifier being coupled to a third external terminal, whereby the gain can be varied by selectively coupling said output terminals to each other directly or through an additional resistor.

7. The improvement according to claim 6 wherein said amplifier further includes third and fourth resistors coupling its non-inverting input to ground and further including a lead between the junction of said two resistors and an external terminal whereby a voltage may be applied to said external terminal for trimming.

* * * * *